Figure 1:
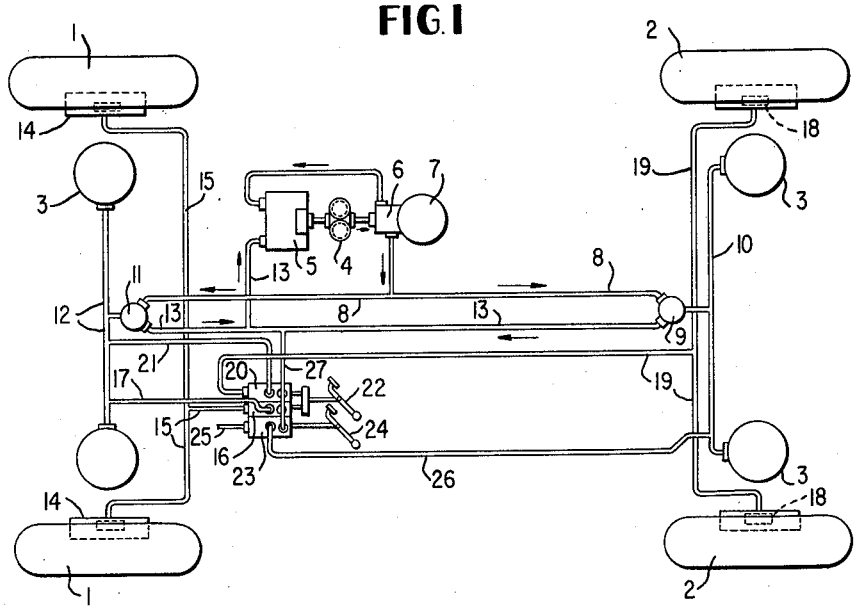

INVENTOR.
FRANZ G. F. BEHLES

Jan. 12, 1965   F. G. F. BEHLES   3,165,363
INTERRELATED FLUID SUSPENSION AND BRAKE SYSTEM FOR VEHICLES
Filed Nov. 28, 1960   2 Sheets-Sheet 2

INVENTOR.
FRANZ G. F. BEHLES
BY
*Dicke, Craig & Freudenberg*
ATTORNEYS

United States Patent Office
3,165,363
Patented Jan. 12, 1965

3,165,363
INTERRELATED FLUID SUSPENSION AND
BRAKE SYSTEM FOR VEHICLES
Franz G. F. Behles, Stuttgart-Schonberg, Germany,
assignor to Daimler-Benz Aktiengesellschaft, Stuttgart-Unterturkheim, Germany
Filed Nov. 28, 1960, Ser. No. 72,103
Claims priority, application Germany Dec. 2, 1959
18 Claims. (Cl. 303—6)

The present invention relates to a motor vehicle, especially passenger motor vehicle in which the vehicle body is supported with respect to the wheel axles by means of oil-air spring elements operatively connected with or coordinated to each vehicle wheel, in which further at least one height-regulating valve is associated with or coordinated to each wheel axle which height-regulating valve controls the supply and discharge of pressure oil to and from the spring elements of the respective wheel axle in dependence on the prevailing distance of the vehicle body from the wheel axle, and in which installations such as the wheel brake and/or clutch installations are provided which are actuated by the oil pressure by means of control valves.

Additionally, the present invention also relates to a particular control valve assembly for use with the spring system described hereinabove which is operatively connected with a pressure oil storage tank existing for installations in the motor vehicles, especially in passenger motor vehicles, such as wheel brake installations, clutch installations etc., which are actuated by pressure oil.

The present invention essentially consists in connecting the control valves for the installations actuated by the oil pressure with the pressure oil spaces of the oil-air spring elements or to the pressure oil lines leading to the oil-air spring elements between the same and the height-regulating valves. The control valve assembly in accordance with the present invention essentially consists in a structural control valve assembly composed of a valve body member simultaneously forming the actuating member for the control valve which is movably arranged within the valve housing in the path of the oil discharge and of a valve body member fixedly arranged and parallel thereto within the path of the oil supply whereby both valve body members are operatively connected with each other by a spring-loaded member which either closes off the oil discharge in connection with the movable valve body member and which, upon actuation of the movable valve body member, closes the oil discharge and opens the oil supply.

According to the present invention, the pressure oil which is present in motor vehicles provided with oil-air spring elements and which is stored in the pressure-oil spaces in the manner of pressure oil storage tanks is utilized for the actuation of other hydraulically actuated installations arranged at the motor vehicle so that with oil-air spring systems without pressure oil tanks no separate storage tank has to be provided in order to make available pressure oil for the actuation of such installations, for example, of the brake installations or clutch installation. However, also with oil-air spring systems provided with pressure oil tanks, the use in accordance with the present invention of the oil spaces in the spring elements as a source of pressure oil entails the advantage with respect to the use of a pressure oil tank that any lack or absence of pressure oil is noticed more rapidly and already prior to the intended use thereof since a spring element which is not filled with pressure oil is noticeable already by the resulting inclination or titling of the vehicle body whereas any absence of pressure in the pressure oil tank could at best be indicated only with the aid of separate indicating or warning devices.

According to a further feature of the present invention, the arrangement may be made with motor vehicles having brake installations at the vehicle wheels actuated by oil pressure by means of control valves in such a manner that separate control valves forming a unitary valve structure are provided for the brake installations at the front axle and for the brake installations at the rear axle which are actuated by a common foot pedal common to both control valves and of which the control valve for the front axle is operatively connected with one or with the oil-air spring elements of the front axle whereas the control valve for the rear axle is operatively connected with one or with the oil-air spring elements of the rear axle. By the use of two control valves with separate circulatory systems, there is obtained a two-circuit brake which increases the safety of operation and additionally there is attained that at each axle, in a desirable manner, the utilizable brake oil pressure is proportional to the corresponding axle load.

With motor vehicles having a clutch installation actuated by oil pressure through a control valve, the control valve for the clutch actuating installation according to the present invention preferably forms a unitary structure with the control valves for the brake installation, and may be connected with the supply line for the pressure oil at a control valve for the brake installation. For reasons of safety of operation, the control valve for the clutch actuating installation may also be connected with an oil-air spring element with which no other control valve is connected, for example, for the brake installation. In case a relatively large number of installations which are to be actuated by means of pressure oil are arranged at the vehicle, it may also be advantageous to connect the control valves for these installations with an oil tank or reservoir, preferably of small dimensions which in turn is connected with the oil-air spring elements.

As compared to the known prior art control valves in which closing and opening of the pressure oil supply takes place by means of the same valve body member as the closing and opening of the oil discharge, the control valve assembly according to the present invention offers an absolute tightness and a low-friction-actuation thereof. Absolute tightness is particularly necessary if the control valve is directly connected with the high pressure tank for the pressure oil in connection with oil-air spring elements or at the spring elements themselves, whereas low-friction actuation is particularly necessary if two circuit brake installations provided with two valves are to be actuated which are operated by means of a scale-beam-like connection.

According to a further feature of the present invention, the spring-loaded valve member according to the present invention is constructed, in a simple manner, as a one-armed lever which abuts under the effect of a pressure spring, with a non-actuated control valve, against the stationary valve body member by means of a ball and closes the oil supply, which additionally, with an actuated control valve, abuts preferably by means of an elastic intermediate member against the movable valve body member and closes off the oil discharge.

The one-armed lever may be constructed advantageously for purposes of manufacture thereof as a part having a rotational symmetry provided with passage bores or flow apertures, in the center of which is arranged the ball cooperating with the stationary or fixed valve body member, and which is provided over an annular area thereof with a rubber seal cooperating with the movable valve body member.

Accordingly, it is an object of the present invention to provide a motor vehicle spring system utilizing pressure oil, especially in passenger motor vehicles, in which the available pressure oil may be used in a very simple manner as well as effectively and reliably for purposes of actuation of other hydraulically actuated installations of the vehicle.

Still another object of the present invention resides in the provision of a control system for a spring system in which the hydraulic medium of the spring system which is under pressure may be used for the actuation of such other vehicle installations as the brake installation, and/or clutch installation of the vehicle without the necessity of separate storage tanks.

Still a further object of the present invention resides in the provision of a hydraulic pressure system adapted to actuate installations in a motor vehicle normally actuated by pressure oil which is so arranged and interconnected with an oil-air spring system of the motor vehicle that any inadequate pressure within the system may be readily noticed even before the intended use of the pressure oil for actuation of such other installation.

A further object of the present invention resides in a provision of a hydraulic system interconnected with the hydraulic system of an oil-air spring system of the vehicle which assures an increased safety as well as ease of operation of a two-circuit brake installation of the vehicle.

Another object of the present invention resides in the provision of a brake actuating system for motor vehicles in which the pressure actuating the respective hydraulically actuated brake of a corresponding wheel is made proportional to the load carried by the corresponding axle thereof.

Still another object of the present invention resides in the provision of a control valve assembly which is simple in structure, compact insofar as its dimensions are concerned, and effective in operation thereof.

Still a further object of the present invention resides in the provision of a control valve system for controlling the supply and discharge of pressure oil which guarantees an absolute tightness and low friction actuation.

Figure 2:
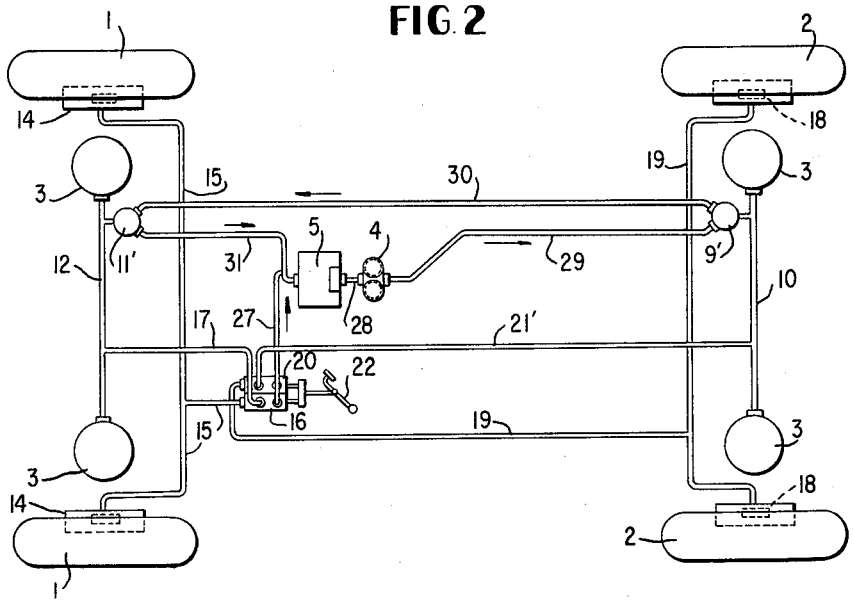
Figure 3:
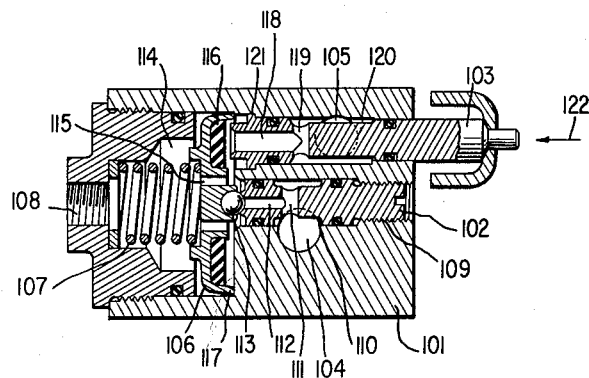
Figure 4:
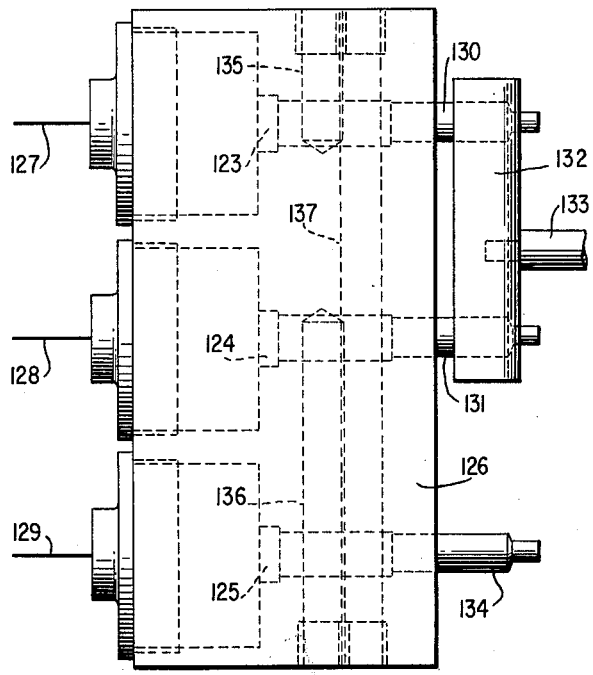

These and other objects, features and advantages of the present invention will become more obvious from the following description when taken in connection with the accompanying drawing which shows, for purposes of illustration only, several embodiments in accordance with the present invention, and wherein FIGURE 1 is a schematic plan view of a motor vehicle provided with an oil-air spring system including pressure oil tanks, FIGURE 2 is a schematic plan view of a motor vehicle provided with a modified embodiment of an oil-air spring system without pressure oil tanks, FIGURE 3 is a longitudinal cross-sectional view through a control valve assembly in accordance with the present invention for use with the systems of FIGURES 1 and 2, and FIGURE 4 is a plan view of three control valves combined in the actual installation thereof within the vehicle.

Referring now to the drawings wherein like reference numerals are used throughout the various views to designate corresponding parts, and more particularly to FIGURE 1, the vehicle wheels of the front axle of this figure are designated by reference numeral 1 and the vehicle wheels of the rear axle by reference numeral 2. Any suitable axle construction, such as independent wheel suspensions, rigid axle, swinging half-axles, etc., may be used. The front and rear wheels 1 and 2 form part of a motor vehicle the details of which are not shown herein for clarity's sake. The vehicle body (not shown) is spring supported by one oil-air spring element 3 each associated with a respective wheel. The oil-air spring element 3 may thereby be of any suitable known construction and will be referred to hereinafter and in the claims as spring elements which spring-support against the wheel suspensions or axles the relatively fixed part of the vehicle which will be referred to hereinafter as vehicle superstructure and which may consist of a frame, chassis frame, or vehicle body, especially of a self-supporting type body construction. The oil pump 4, of known construction, draws in oil from the storage tank or sump 5 and forces the oil into the pressure-oil tank 7 provided with a control valve 6. The pressure oil tank 7 is connected by line 8 with the height-regulating valve 9 from which lines 10 lead to the individual spring elements 3 at the rear axle. Additionally, the storage tank 7 is connected with the height regulating valve 11 by line 8 from which lines 12 lead to the spring elements 3 at the front axle. The excess oil controlled or valved by the height-regulating valves 9 and 11 flows from respective spring elements 3 through discharge lines or return lines 13 back into the oil supply tank or sump 5.

For purposes of supplying the wheel brakes 14 at the vehicle wheels 1 of the front axle with pressure oil, the brake cylinders thereof are connected by lines 15 with the control valve 16 which is connected by means of line 17 to the line 12 at a point thereof intermediate both spring elements 3 of the front axle and the height regulating valve 11. In a similar manner, for purposes of supplying the wheel brakes 18 at the vehicle wheels 2 of the rear axle with pressure oil, the brake cylinders thereof are connected by lines 19 with the control valve 20 which, in turn, is also connected by means of line 21 with the line 12. The control valves 16 and 20 form a unitary structure and the common actuation thereof takes place by means of the foot brake pedal 22. Additionally, the control valve 23 is connected to the control valves 16 and 20. The control valve 23 serves to control, by means of clutch foot pedal 24, pressure oil through line 25 to the clutch (not illustrated) which is arranged normally between engine and transmission. For this purpose, the control valve 23 is connected by means of line 26 to the line 10 at a point intermediate the spring elements 3 of the rear axle and the associated height control valve 9. All three control valves 16, 20, and 23 having a common return line 27 for the excess oil. This line 27 leads to the line 13 connected with the supply tank 5.

Upon actuation of the foot brake pedal 22, the two control valves 16 and 20 are actuated in unison so that pressure oil is controllably supplied over lines 15 to the brake cylinders of the wheel brakes 14 at the vehicle wheels 1 of the front axle from line 12 and therewith also from the spring elements 3 of the front axle which serve as pressure oil source. At the same time, pressure oil is controllably supplied from line 12 by means of control valve 20 through lines 19 to the brake cylinders of the wheel brakes 18 at the wheels 2 of the rear axle. During actuation of the clutch foot pedal 24, the control valve 23 controls pressure oil through line 25 to the clutch between engine and transmission which pressure oil is taken out of line 10 and therewith from the spring elements 3 at the rear axle which serve as pressure oil source by means of line 26.

In the oil-air spring system for a motor vehicle illustrated in FIGURE 2, a spring system is provided which does not necessitate any pressure-oil tank. The control valves 9' and 11' for the spring elements 3 are constructed both as height-regulating valves as well as flow-control valves. Both control valves 9' and 11' are connected in series one behind the other within an oil circulatory system which consists of the oil supply tank 5, of the oil line 28 leading from the tank 5 to the oil pump 4, of the oil line 29, leading from pump 4 to the control valve 9', of the oil line 30 leading from the control valve 9' to the control valve 11', and of the oil line 31 leading from the control valve 11' to the supply tank 5. The spring elements 3 which are coordinated to the vehicle wheels 2 of the rear axle are connected with the control valve 9' by means of line 10. The spring elements 3 which are coordinated to the vehicle wheels 1 of the front axle are connected to the control valve 11' by means of line 12.

For purposes of actuating the brake installations 14 at the wheels 1 of the front axle and the brake installations 18 at the wheels 2 of the rear axle by means of pressure oil, there are provided control valves 16 and 20 combined into a unitary structure which are operatively connected with foot brake pedal 22. The control valve 16 for the front axle receives pressure oil from line 12 by means of line 17 and supplies the pressure oil through line 15 to the brake installations 14. In contradistinction to the arrangement of the embodiment illustrated in FIGURE 1, the control valve 20 receives pressure oil from line 10 at the rear axle by means of line 21' and supplies this pressure oil through line 19 to the brake installations 18 at the rear axle. The braking force exerted at the brake installations 14 and 18 thereby behaves in this embodiment like the respective axle loads. This means, the wheel axle which is more heavily loaded is also more heavily braked. A return line 27 common to both control valves 16 and 20 leads from these control valves to line 31.

Of course, the arrangement in accordance with the present invention may also be so modified that only a single control valve is provided for the wheel brakes at the front axle and at the rear axle of the motor vehicle and pressure oil is taken off only from the spring elements of one wheel axle whereas pressure oil for the clutch actuating installation is taken off from the spring elements of the other wheel axle.

The oil loss in the spring elements 3 upon actuation of the actuators 22 and/or 24 results in a temporary slight lowering of the vehicle body or vehicle superstructure. Simultaneously, however, the height control valves 9 and 10 or 9' and 10' become operative and assure a corresponding quantity of fresh pressure oil is supplied to the spring elements 3 until the vehicle body again reassumes its initial position.

A preferred construction for the control valve to be used in a system according to the present invention is illustrated in FIGURE 3 in which the control valve essentially consists of housing 101, of the two valve body members 102 and 103 arranged parallel to one another which are disposed in the path of the supply bore 104 and of the discharge bore 105, respectively, and of the member 106 operatively connected with both valve body members 102 and 103 which is spring loaded by the pressure spring 107 and controls the pressure oil to the line 108, i.e., permits the pressure oil to flow off through the same. The line 108 leads to an installation in the vehicle to be actuated by oil pressure, such as the brake installation, clutch installation, shifting installation, vehicle lifter, opening and closing installations or the like.

The valve body member 102 is securely seated, i.e., is fixed or stationary within the housing 101 by means of the thread 109, however, in such a manner that its position may be changed in the axial direction thereof from outside of the housing 101 for purposes of adjustment or readjustment. Additionally, the valve body member 102 is so constructed that the pressure oil flowing through the supply bore 104 may pass through the annular space 110 into the bore 111 and into bore 112. The ball 113 which is seated at the spring-loaded member 106 is forced against the orifice of the bore 112.

The member 106 arranged within the space 114 of the housing 101 is constructed in the manner of a dish-shaped member having a symmetry of rotation. The ball 113 is seated in the center of this member 106. Additionally, the member 106 is provided with flow apertures or bores 115 and accommodates the annularly-shaped rubber seal 116. With a non-actuated control valve, the member 106 assumes the position indicated in FIGURE 1 in which the member 106 abuts with the lower rim portion 117 thereof at the housing 101 and with the center through ball 113 at the fixed valve body member 102.

The valve body member 103 arranged above the valve body member 102 is arranged so as to be movable in the axial direction thereof within housing 101. For purposes of actuation, the valve body member 103 or a part thereof extends outside the housing 101. By reason of the axial bore 118 within the valve body member 103, and additionally by reason of the bore 119 and of the annular space 120, line 108 is in communication over the space 114 and the bores 115 within the member 106 with the discharge bore 105 as long as the valve body member 103 assumes the position thereof indicated in FIGURE 1 in which it is non-actuated and in which it abuts by means of the collar 121 thereof against the housing 101.

The member 106, loaded by means of the pressure spring 107 together with the ball 113 serves in connection with the valve body member 102 as excess pressure valve for the pressure prevailing in the supply bore 104 or the oil pressure tank connected therewith. If the excess pressure valve structure becomes operative, then oil, which leaves from bore 112 arranged within the valve body member 102 into the space 114, may flow off unimpededly through the bores 118 and 119 within the valve body member 103 without building up any pressure within the space 114 or in the line 108.

*Operation*

The operation of the valve assembly of FIGURE 3 is as follows.

With a pressure applied to the valve body member 103 in the direction of arrow 122, in order to control pressure oil supply into line 108 and therewith to an installation to be actuated by oil pressure, the valve body member 103 lifts off from its abutment against the housing 101 and abuts with the end face thereof extending into the space 114 against the rubber seal 116 provided at the member 106. At first, by closing the bore 118, the discharge to the oil tank through the discharge bore 105 is blocked or closed off, and additionally the member 106 which abuts with the lower rim portion 117 thereof at the housing 101 is swung about this support against the effect of the pressure spring 107 so that the ball 113 lifts off from the orifice of the bore 112 in the valve body member 102. As a result thereof, the pressure oil reaches the space 114 between the member 106 and the valve body 102, flows through the bores 115 and partly also along the circumference of the member 106 into the space 114 between the member 106 and the pressure spring 107, and thereby reaches the bore 108. Any release of the actuating force applied to the valve body member 103 in the direction of arrow 122 below the value corresponding to that of the oil pressure in space 114 has as result that the member 106 with the ball 113 thereof approaches the valve body member 102 and finally closes the bore 112 altogether so that no more pressure oil can reach the line 108 from the supply bore 104. A slight movement of the valve body member 103 in a direction opposite that of arrow 122, produced, for example, through a spring which engages with an actuating lever or the like, causes a disengagement of the end face of the valve body member 103 from the rubber seal 116 so that oil from line 108 may reach the discharge bore 105 whereupon a pressure reduction occurs within the space 114.

In FIGURE 4, three control valves 123, 124 and 125 are arranged in a common housing 126. The line 127 from the control valve 123 is connected with the brakes at the rear wheels of a motor vehicle, the line 128 from the control valve 124 is connected with the brakes at the front wheels and the line 129 leads to the clutch installation. The valve body members 130 and 131 of the control valves 123 and 124 are connected with each other by means of a cross-tie 132 at which engages the common actuating member 133 which may be in the form of a pedal. No separate actuating member is illustrated in FIGURE 4 for the valve body member 134 of the control valve 125. The supply bores 135 and 136 corresponding to the supply bore 104 in FIGURE 3 for the pressure oil and the discharge bore 137 corresponding to the discharge bore 105 in FIGURE 3 for excess oil are disposed transversely to the valve body member 130, 131 and 134 and valve these bores tangentially in which movable ones of the valve body members are movably arranged in the axial direction thereof. The supply bore 135 is arranged on one side of the housing 126 and leads exclusively to the control valve 123. The supply bore 136 is disposed on the other side of the housing 126 and leads to the control valves 124 and 125. The discharge bore 137 connects all control valves together.

While I have shown and described several embodiments in accordance with the present invention, it is understood that the same is not limited thereto but is susceptible of many changes and modifications within the spirit and scope of the present invention and I, therefore, do not wish to be limited to the details shown and described herein but intend to cover all such changes and modifications as are encompassed by the scope of the appended claims.

I claim:

1. A motor vehicle, especially passenger motor vehicle having a vehicle superstructure spring-supported with respect to the front and rear axle means coordinated to each vehicle wheel by respective oil-air spring means, comprising a plurality of oil-air spring means for the vehicle axle means, supply means for supplying pressure oil, first connecting means providing for the supply and discharge of pressure oil from said supply means to and from said spring means including height adjusting valve means coordinated to at least each axle means for selectively controlling the pressure oil in dependence on the distance of the vehicle superstructure from a respective axle means, oil-pressure actuated means including brake installations at the vehicle wheels, separate control valve means for the brake installations of the front axle means and rear axle means, common actuating means for both said control valve means, second connecting means including the control valve means for the brake installations of the front axle means for effectively connecting said last-mentioned brake installations with the pressure oil acting on the spring means of the front axle means, and third connecting means including the control valve means for the brake installations of the rear axle means for effectively connecting said last-mentioned brake installations with the pressure oil acting on the spring means of the rear axle means.

2. A motor vehicle according to claim 1, wherein said separate control valve means are combined into a structural unit, wherein said common actuating means is a common foot pedal, and wherein said second and third connecting means are effectively connected with the section of said first connecting means leading from the respective height adjusting valve means to the spring means of the corresponding axle means intermediate the spring means thereof.

3. A control valve assembly adapted to be connected with a pressure oil tank for selectively valving installations in motor vehicles, especially in passenger motor vehicles, that are normally actuated by pressure oil such as brake installations, clutch installations and the like, comprising housing means, oil discharge means and oil supply means within said housing means, first valve body means movably arranged within said housing means in the path of said oil discharge means and constituting simultaneously the actuating member of the control valve, second relatively fixed valve body means arranged essentially parallel to said first valve body means within said housing means within the path of said oil supply means, and spring-loaded means operatively connecting said two valve body means with each other for selectively closing said oil supply means in connection with said second valve body means while keeping open said oil discharge means in connection with said valve body means or for closing said oil discharge means upon actuation of said first valve body means while opening said oil supply means, said spring-loaded means including aperture means therein for the flow therethrough of pressure oil.

4. A control valve assembly according to claim 3, wherein said first valve body means is adjustable from outside said housing means.

5. A control valve assembly adapted to be connected with a pressure oil tank for selectively valving installations in motor vehicles, especially in passenger motor vehicles, that are normally actuated by pressure oil such as brake installations, clutch installations and the like comprising housing means, oil discharge means, oil supply means and oil output means within said housing, a first valve body member movably arranged within said housing means in the path of said oil discharge means and constituting simultaneously the actuating member of the control valve, a second relatively fixed valve body member arranged within said housing means essentially parallelly to said first-mentioned valve body member within the path of said oil supply means, each of said valve body members being provided with bore means, and spring-loaded means operatively connecting said two valve body members with each other for selectively closing said oil supply means in connection with said second valve body member while keeping open said oil discharge means in connection with said first valve body member or for closing said oil discharge means upon actuation of said first valve body member while opening said oil supply means to be in communication with said oil output means, said spring-loaded means being effectively constructed as a one-armed lever, a compression spring for spring-loading said lever, a ball member seated in said lever which abuts as a result of the spring force on said lever against the second valve body member to close the bore means thereof upon non-actuation of said first valve body member to thereby close the oil supply, said one-armed lever effectively abutting upon actuation of said first valve body member against the latter to close the oil discharge.

6. A control valve assembly according to claim 5, wherein said one-armed lever is constructed in a dish-shaped manner as a part having a symmetry of rotation and provided with flow aperture means, said ball member being seated in the center of said lever and cooperating with said second valve body member, and a rubber seal arranged along an annular surface of said lever and cooperating with said first valve body member.

7. A control valve assembly according to claim 6, wherein said second valve body member is threadably secured within said housing means and is adapted to be adjusted in its position within said housing means from the outside thereof.

8. A valve control assembly according to claim 6, wherein three control valves are arranged within a common housing means alongside each other with the axes of the movable valve body members disposed essentially parallelly, said three control valves having a common discharge means, and common supply means for two of said control valves while the third one has a separate supply means.

9. A hydraulic system for a motor vehicle, especially passenger motor vehicle having a vehicle superstructure spring-supported with respect to the axle means coordinated to each vehicle wheel by respective oil-air spring means, comprising a plurality of oil-air spring means operatively connected with the axle means of the vehicle, supply means for supplying a hydraulic medium under pressure, connecting means including height control valve means for controlling the supply and discharge of the hydraulic medium under pressure from said supply means to said spring means in dependence on the distance of the vehicle superstructure from a respective axle means, at least one further installation adapted to be actuated by said hydraulic medium, and further connecting means including control valve means for selectively supplying hydraulic medium under pressure effectively from the hydraulic medium operating on said spring means to said hydraulic medium actuated installation, said control valve means inclusive in said further connecting means including a control valve housing provided with supply means and discharge means for supplying and discharging, respectively, the hydraulic medium under pressure, first valve body means movably arranged within said housing means in the path of said discharge means and forming also an actuating member for the control valve means, second relatively fixed valve body means arranged within said housing and within the path of said supply means, said first and second valve body means being essentially parallel to each other, and spring-loaded means operatively connecting said two-valve body means with each other for selectively closing said supply means with said second valve body means while retaining open said discharge means with said first valve body means or for closing said oil discharge means upon actuation of said first valve body means while simultaneously opening said supply means, said spring-loaded means including aperture means therein permitting flow of pressure medium from said pressure-oil actuated means to said discharge means when said supply means is closed.

10. In a motor vehicle, especially passenger motor vehicle having a vehicle superstructure spring-supported with respect to the front and rear axle means coordinated to each vehicle wheel by respective oil-air spring means, the combination comprising a plurality of oil-air spring means for the front and rear axle means, supply means for supplying pressure oil, connecting means including height-adjusting valve means for selectively controlling the supply of pressure oil from said supply means to said spring means and for selectively controlling the discharge of pressure oil from said spring means in dependence on the respective distance of the vehicle superstructure from a corresponding axle means, oil-pressure actuated means including brake installations for the wheels of the front axle means and brake installations for the wheels of the rear axle means, further connecting means including control valve means for selectively supplying pressure oil to said pressure-oil actuated means from the pressure oil effective on at least some of said spring means, said control valve means consisting of two separate control valves, one control valve each controlling the brake installations of a respective one of said front and rear axle brake installations to thereby effectively constitute a two-circuit brake system, and a clutch installation adapted to be actuated by pressure oil, and third connecting means including additional control valve means operatively connecting said pressure oil actuated clutch installation with at least one of said spring means, one of the control valve means for said brake installations and the control valve means for the clutch installation having a common input whereas the other control valve means for the brake installations has a separate input.

11. In a motor vehicle, the combination according to claim 10 wherein said control valve means form a structural unit.

12. In a motor vehicle, the combination according to claim 10, wherein the control valve means for the clutch installation is connected with a spring means with which none of the control valve means for the brake installations are connected.

13. In a motor vehicle, the combination according to claim 10 wherein each said control valve means includes housing means, oil discharge means and oil supply means within said housing means, first valve body means movably arranged within said housing means in the path of said oil discharge means and constituting simultaneously the actuating member of the control valve, second relatively fixed valve body means arranged essentially parallel to said first valve body means within said housing means within the path of said oil supply means, and spring-loaded means operatively connecting said two-valve body means with each other for selectively closing said oil supply means in connection with said second valve body means while keeping open said oil discharge means in connection with said valve body means or for closing said oil discharge means upon actuation of said first valve body means while opening said oil supply means, said spring-loaded means including aperture means therein permitting flow of pressure medium from said pressure-oil actuated means to said discharge means when said supply means is closed.

14. In a motor vehicle, especially passenger motor vehicle having a vehicle superstructure spring-supported with respect to the front and rear axle means coordinated to each vehicle wheel by respective oil-air spring means, the combination comprising a plurality of oil-air spring means for the front and rear axle means, supply means for supplying pressure oil, connecting means including height-adjusting valve means for selectively controlling the supply of pressure oil from said supply means to said spring means and for selectively controlling the discharge of pressure oil from said spring means in dependence on the respective distance of the vehicle superstructure from a corresponding axle means, oil-pressure actuated means including brake installations for the wheels of the front axle means and brake installations for the wheels of the rear axle means, further connecting means including control valve means for selectively supplying pressure oil to said pressure-oil actuated means from the pressure oil effective on at least some of said spring means, said control valve means consisting of two separate control valves, one control valve each controlling the brake installations of a respective one of said front and rear axle brake installations to thereby effectively constitute a two-circuit brake system, and a clutch installation adapted to be actuated by pressure oil, and third connecting means including additional control valve means operatively connecting said pressure oil actuated clutch installation with at least one of said spring means, each said control valve means includes housing means, oil discharge means and oil supply means within said housing means, first valve body means movably arranged within said housing means in the path of said oil discharge means and constituting simultaneously the actuating member of the control valve, second relatively fixed valve body means within said housing means and in the path of said oil supply means, and spring-loaded means operatively connecting said two-valve body means with each other for selectively closing said oil supply means in connection with said second valve body means while retaining open said oil discharge means in connection with said first valve body means or for closing said oil discharge means upon actuation of said first valve body means while opening said oil supply means, said spring-loaded means being constructed as a spring-loaded one-armed lever abutting under the effect of a compression spring with a ball member seated in the center thereof against said second valve body means to close the oil supply upon nonactuation of said first valve body means and which additionally abuts upon actuation of said first valve body means by the interposition of an elastic intermediate member at the movable valve body means to thereby close the oil discharge, said one-armed lever being of essentially dish-shape having a symmetry of rotation provided with aperture means for the flow of pressure oil therethrough, said intermediate member being in the form of an annular rubber seal arranged at said one-armed lever, and said first valve body means being adapted to be adjusted from outside of said housing means.

15. A control valve assembly adapted to be connected with a pressure oil tank for selectively valving installations in motor vehicles, especially in passenger motor vehicles, that are normally actuated by pressure oil such as brake installations, clutch installations and the like, comprising housing means, oil discharge means and oil supply means within said housing means, first valve body means movably arranged within said housing means in the path of said oil discharge means and constituting simultaneously the actuating member of the control valve, second relatively fixed valve body means arranged within said housing means within the path of said oil supply means, and spring-loaded means operatively connecting said two-valve body means with each other for selectively closing said oil supply means in connection with said second valve body means while keeping open said oil discharge means in connection with said valve body means or for closing said oil discharge means upon actuation of said first valve body means while opening said oil supply means, said spring-loaded means being constructed as a one-armed lever, a ball member seated in said spring-loaded means in such a manner that under the effect of the spring loading force, with a non-actuated control valve, said lever abuts with said ball against the second valve body means and closes the oil supply, said lever abutting, upon actuation of the control valve, at said first valve body means and closing the oil discharge.

16. A control valve assembly adapted to be connected with a pressure oil tank for selectively valving installations in motor vehicles, especially in passenger motor vehicles, that are normally actuated by pressure oil such as brake installations, clutch installations and the like, comprising housing means, oil discharge means and oil supply means within said housing means, first valve body means movably arranged within said housing means in the path of said oil discharge means and constituting simultaneously the actuating member of the control valve, second relatively fixed valve body means arranged within said housing means within the path of said oil supply means, and spring-loaded means operatively connecting said two-valve body means with each other for selectively closing said oil supply means in connection with said second valve body means while keeping open said oil discharge means in connection with said valve body means or for closing said oil discharge means upon actuation of said first valve body means while opening said oil supply means, said spring-loaded means being constructed as a one-armed lever of dish-shaped rotational symmetry and provided with aperture means for the flow therethrough of the pressure oil, a ball member arranged in the center of said lever and cooperating with said second valve body means, and rubber seal means provided along an annular surface of said lever for cooperating with said first valve body means.

17. In a motor vehicle, especially passenger motor vehicle having a vehicle superstructure spring-supported with respect to the front and rear axle means coordinated to each vehicle wheel by respective oil-air spring means, the combination comprising a plurality of oil-air spring means for the front and rear axle means, supply means for supplying pressure oil, connecting means including height-adjusting valve means for selectively controlling the supply of pressure oil from said supply means to said spring means and for selectively controlling the discharge of pressure oil from said spring means in dependence on the respective distance of the vehicle superstructure from a corresponding axle means, oil-pressure actuated means including brake installations for the wheels of the front axle means and brake installations for the wheels of the rear axle means, further connecting means including control valve means for selectively supplying pressure oil to said pressure-oil actuated means from the pressure oil effective on at least some of said spring means, said control valve means consisting of two separate control valves, one control valve each controlling the brake installations of a respective one of said front and rear axle brake installations to thereby effectively constitute a two-circuit brake system.

18. In a motor vehicle, the combination according to claim 17, further comprising a pressure oil storage tank of relatively small dimensions for the oil-pressure actuated means in operative connection with the respective oil-air spring means.

References Cited in the file of this patent
UNITED STATES PATENTS

| | | |
|---|---|---|
| 1,809,069 | Sanford | June 9, 1931 |
| 2,150,576 | Bell | Mar. 14, 1939 |
| 2,535,300 | Le Tourneau | Dec. 26, 1950 |
| 2,538,274 | Sanmori | Jan. 16, 1951 |
| 2,757,376 | Brueder | July 31, 1956 |
| 2,841,178 | Schultz | July 1, 1958 |
| 2,857,930 | Dombre | Oct. 28, 1958 |
| 2,923,557 | Schilling | Feb. 2, 1960 |
| 2,942,623 | Schwartz | June 28, 1960 |
| 2,991,130 | Sampietro | July 4, 1961 |

FOREIGN PATENTS

| | | |
|---|---|---|
| 773,158 | Great Britain | Apr. 24, 1957 |